UNITED STATES PATENT OFFICE.

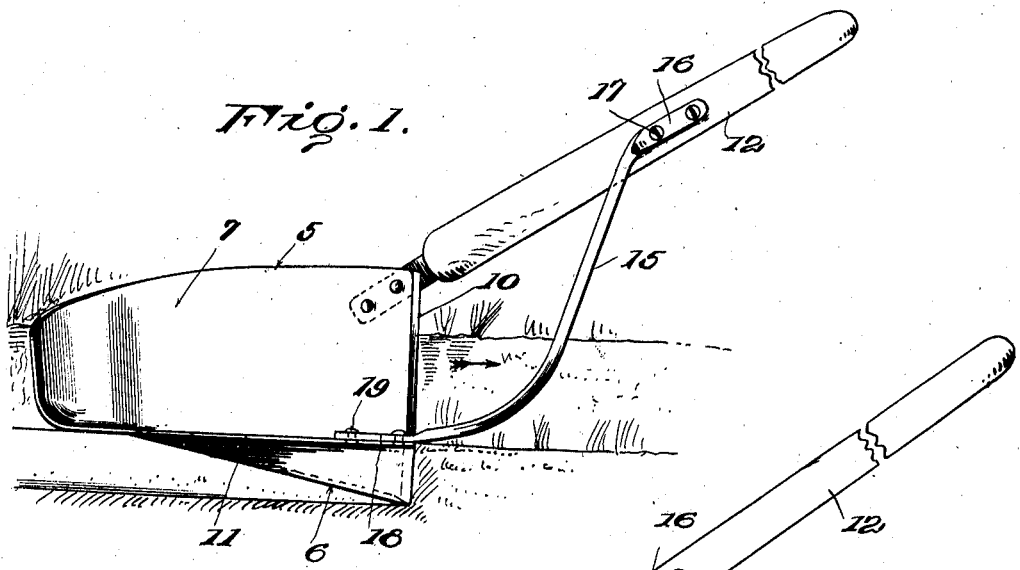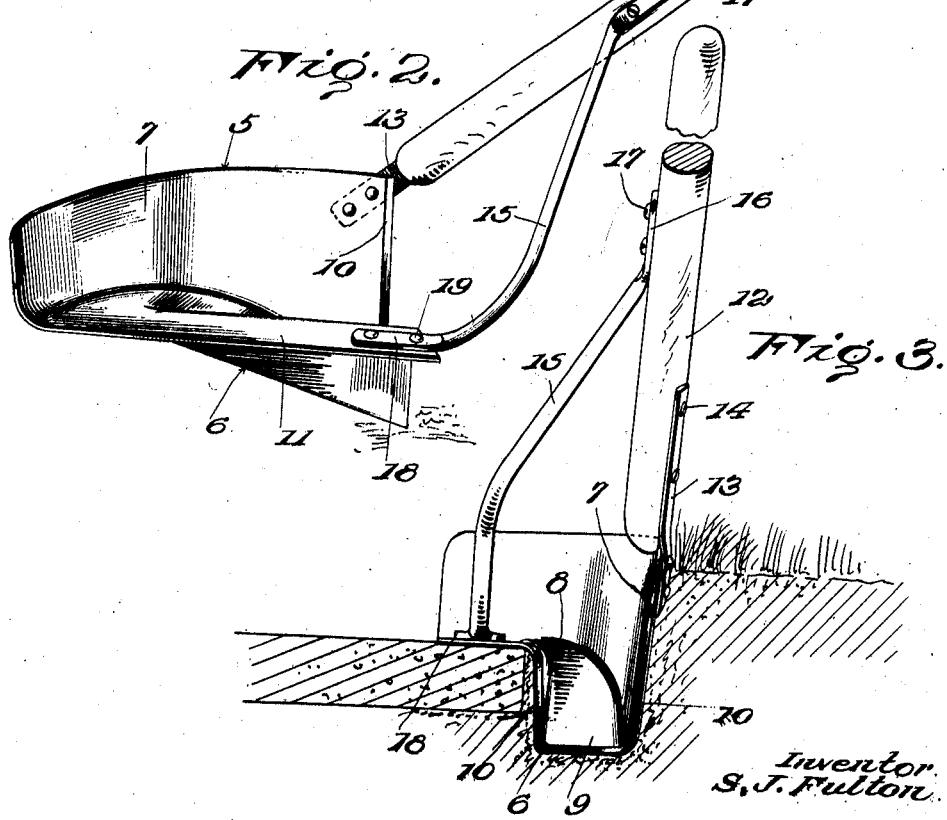

SHERMAN J. FULTON, OF CLEVELAND, OHIO.

LAWN-TRIMMER.

1,331,750.  Specification of Letters Patent.  Patented Feb. 24, 1920.

Application filed September 27, 1919. Serial No. 326,731.

*To all whom it may concern:*

Be it known that I, SHERMAN J. FULTON, a citizen of the United States, residing at Cleveland, in the county of Cuyahoga and State of Ohio, have invented certain new and useful Improvements in Lawn-Trimmers, of which the following is a specification.

This invention relates to improvements in lawn trimmers and more particularly to a device especially adapted for use in cutting a small groove or trench in a lawn adjacent a walk or flower bed.

An important object of this invention is to provide a lawn trimming device of the class described having novel means for providing a trench of uniform depth and thickness throughout its entire length for presenting a neat and finished appearance to the lawn.

A further object of the invention is to provide a lawn trimming device of the class described having novel means for discharging the dirt, loosened in forming the trench, to one side of the trench, preferably on the walk.

A further object of the invention is to provide a lawn trimming device of the class described which is simple, of highly simplified construction and desirable in use.

Other objects and advantages of the invention will be apparent during the course of the following description.

In the accompanying drawing forming a part of this application, and in which like numerals are employed to designate like parts throughout the same, Figure 1 is a fragmentary side elevation of a lawn trimming device embodying the invention, Fig. 2 is a fragmentary perspective of the same, Fig. 3 is a fragmentary front elevation of the same in use.

In the drawing wherein for the purpose of illustration is shown a preferred embodiment of the invention, the numeral 5 generally designates a share constructed from a single triangular piece of flat metal having a downwardly bent portion extending along one straight edge thereof for forming a shovel 6 which as illustrated in Fig. 3 is U-shaped in cross section and is provided with wide and narrow sides 7 and 8 respectively. The floor or bottom 9 of the shovel 6 is inclined upwardly toward its rear end and is curved outwardly for directing dirt from the shovel. The forward end of the shovel 6 is provided with horizontal and upright beveled cutting blades 10 adapted for cutting through the dirt or sod while being moved along the ground. One edge portion of the triangular piece of metal is arranged horizontally for forming a guide flange 11 adapted to be arranged flatly upon the sidewalk along the edge of the same for presenting the shovel to the earth at an angle. As illustrated in Fig. 2, the rear end portion of the gage or guide flange 11 joins the rear end portion of the side 7 which is curved longitudinally for discharging the dirt to the walk from the rear end portion of the guide flange.

A handle 12 is attached to the share by a metal strap 13 secured to the forward end of the handle and the side 7 of the share by rivets 14. As illustrated in Fig. 1, the handle 12 extends forwardly from the share at an angle of about forty-five degrees and may terminate at any desired point above the walk. A bracing arm 15 is flattened at its upper end portion as indicated at 16 and is secured to the handle by screws or other suitable fastening devices 17. The lower end portion of the bracing arm 15 is flattened as indicated at 18 and is secured to the upper side of the guide flange 11 by rivets 19 or other fastening devices. The bracing arm 15 serves to strengthen the guide flange 11 and retain the shovel 6 in its proper position. With reference to Fig. 3, it will be noted that the bracing arm 15 straddles the shovel and permits the dirt to pass freely through the same upon being loosened.

In the practice of the invention, the share is engaged with the ground by forcing the cutting edge 10 of the shovel into the ground until the guide flange or ledge 11 of the same flatly abuts the sidewalk. The shovel is now drawn along in the direction indicated by the arrow in Fig. 1 for loosening up the dirt and providing a U-shaped trough. With reference to Fig. 3, it will be noted that the sides 7 and 8 are inclined outwardly for providing inwardly inclined walls to the trench, whereby the side walls of the trench are prevented from breaking down as the result of people walking over the lawn, etc. As in the case of all well kept lawns, the surface of the lawn is arranged above the plane of the sidewalk and therefore the wide portion 7 of the shovel cuts through the elevated portion of the lawn and also serves to expel the dirt cut by the shovel.

During the travel of the share, the dirt is discharged from the share by the curved side 7 and a trench of uniform depth and width is provided.

It is to be understood that the form of the invention herewith shown and described is to be taken as the preferred example of the same and that such minor changes in arrangement and construction of parts may be made as will remain within the spirit of the invention and the scope of what is claimed.

Having thus described the invention, what is claimed is:

1. A lawn trimming device including a share formed from a single triangular piece of metal bent to form a shovel extending in spaced parallel relation to one straight edge of the piece of metal, said shovel being U-shaped in cross section and having wide and narrow sides, said wide side having its rear end portion curved longitudinally for expelling the dirt from the share, and a handle connected to the wide side of said shovel.

2. A lawn trimming device formed from a single piece of triangular metal having one edge portion arranged horizontally for forming a guide flange, said piece of metal being bent adjacent said guide flange for forming a shovel having its forward edges sharpened, one side of said shovel being extended above the plane of said guide flange and being curved longitudinally and arranged rearwardly of said guide flange for expelling the dirt from the shovel, and a handle attached to said share.

3. A lawn trimming device including a share formed from a triangular piece of metal having a bend extending in spaced parallel relation to one edge of the same, thereby forming a shovel, said shovel having its lower side inclined upwardly for elevating the dirt, one edge portion of said piece of metal being extended outwardly from said shovel for forming a guide flange, a handle connected to said share, and a bracing arm connecting said handle and said guide flange.

4. A lawn trimming device including a share formed from a triangular piece of metal having a bend extending at right angles to one straight edge of the same for forming a shovel, said shovel being U-shaped in cross section and having its bottom inclined upwardly and its sides inclined outwardly, one edge portion of said piece of metal being extended outwardly from said shovel for forming a guide flange, the rear end portion of one of the sides of said trough being curved and joined with the rear end portion of said guide flange, and a handle connected to said share.

5. A lawn trimming device including a horizontally arranged guide flange, a shovel depending from one longitudinal edge of said guide flange and being U-shaped in cross section, the bottom wall of said shovel being inclined upwardly and having its rear end terminating in the horizontal plane of said guide flange, the side walls of said shovel being inclined outwardly and having their forward edges sharpened, one side wall of said shovel being extended above the horizontal plane of said guide flange and having its rear end portion curved and arranged rearwardly of said guide flange.

6. A lawn trimming device including a horizontally arranged guide flange, a shovel depending from one longitudinal edge of said guide flange and being U-shaped in cross section, one side of said shovel being extended above the horizontal plane of said guide flange and having its rear end portion curved and arranged rearwardly of said guide flange, a handle attached to the upwardly extending side of said shovel, and a bracing arm connected to said guide flange and to said handle.

In testimony whereof I affix my signature.

SHERMAN J. FULTON. [L. S.]